(12) United States Patent
Yamato et al.

(10) Patent No.: US 7,257,316 B2
(45) Date of Patent: Aug. 14, 2007

(54) PROGRAM RECORDING DEVICE AND METHOD OF RECORDING PROGRAM

(75) Inventors: Jun-Ichi Yamato, Tokyo (JP); Akihisa Kenmochi, Tokyo (JP)

(73) Assignee: NEC Corporation, Tokyo (JP)

(*) Notice: Subject to any disclaimer, the term of this patent is extended or adjusted under 35 U.S.C. 154(b) by 1149 days.

(21) Appl. No.: 10/091,441

(22) Filed: Mar. 7, 2002

(65) Prior Publication Data

US 2002/0127000 A1    Sep. 12, 2002

(30) Foreign Application Priority Data

Mar. 7, 2001    (JP)    ............... 2001-063742

(51) Int. Cl.
*H04N 7/26* (2006.01)
*G06F 3/00* (2006.01)

(52) U.S. Cl. ............... 386/112; 386/83; 725/46
(58) Field of Classification Search ............... 386/1, 386/83, 112; 725/38, 39, 46–51, 54, 58, 725/105
See application file for complete search history.

(56) References Cited

U.S. PATENT DOCUMENTS 5,410,344 A * 4/1995 Graves et al. ............... 725/46
5,790,935 A * 8/1998 Payton ............... 725/91
6,160,844 A * 12/2000 Wilkinson ............... 375/240
6,671,454 B1 * 12/2003 Kaneko et al. ............... 386/83
2002/0104094 A1 * 8/2002 Alexander et al. ............... 725/105

FOREIGN PATENT DOCUMENTS

| JP | 10-66018 | 3/1998 |
| JP | 10-190998 | 7/1998 |
| JP | 2000-29756 | 1/2000 |
| JP | 2000-217063 | 8/2000 |
| JP | 2000-341627 | 12/2000 |

* cited by examiner

*Primary Examiner*—James J. Groody
*Assistant Examiner*—Mishawn Dunn
(74) *Attorney, Agent, or Firm*—Sughrue Mion, PLLC

(57) ABSTRACT

A program recording device 10 compresses data of program recorded in a hard disk, at a user's desirable timing in a user's desirable compression level. A recording unit 11 records data of a program, and a re-compression scheduler 14 includes a compression setting table having a re-compression condition and an encoding method used in a compressing process. The re-compression condition and the encoding method are, in advance, established for each compressing timing. Then the scheduler 14 is activated in a predetermined interval and selects a program satisfying the re-compression condition among programs recorded by the recording unit 11. The re-compressing unit 15 compresses data of the selected program.

26 Claims, 16 Drawing Sheets

| IDENTIFICATION INFORMATION | | | | ACCUMULATE STATE INFORMATION | | | |
|---|---|---|---|---|---|---|---|
| ... | BROAD-CASTING STATION | BROAD-CASTING DATE & TIME | ... | NO. OF COMPRES-SIONS | COMPRES-SION DATE & TIME | ENCODING METHOD | ... |
| xx | xxx | xxxx | xx | x | xxxx | xxx | xx |
| xx | xxx | xxxx | xx | x | xxxx | xxx | xx |
| . | . | . | . | . | . | . | . |
| . | . | . | . | . | . | . | . |
| . | . | . | . | . | . | . | . |

FIG. 2

| THE UPPER LIMIT VALUE | NO. OF COMPRES-SIONS | RE-COMPRESSION PERIOD | ENCODING METHOD |
|---|---|---|---|
| x | 1<br>2<br>3<br>.<br>. | xxx<br>xxx<br>xxx<br>.<br>. | xxx<br>xxx<br>xxx<br>.<br>. |

FIG. 3

| IDENTIFICATION INFORMATION | | | | ACCUMULATE STATE INFORMATION | | | |
|---|---|---|---|---|---|---|---|
| ... | BROAD-CASTING STATION | BROAD-CASTING DATE & TIME | IMPOR-TANCE | NO. OF COMPRES-SIONS | COMPRES-SION DATE & TIME | ENCODING METHOD | ... |
| xx | xxx | xxxx | xx | x | xxxx | xxx | xx |
| xx | xxx | xxxx | xx | x | xxxx | xxx | xx |
| . | . | . | . | . | . | . | . |
| . | . | . | . | . | . | . | . |
| . | . | . | . | . | . | . | . |

FIG. 5

| IMPOR-TANCE | THE UPPER LIMIT VALUE | NO. OF COMPRES-SIONS | RE-COMPRESSION PERIOD | ENCODING METHOD |
|---|---|---|---|---|
| 1 | x | 1<br>2<br>3<br>.<br>. | xxx<br>xxx<br>xxx<br>.<br>. | xxx<br>xxx<br>xxx<br>.<br>. |
| 2 | x | 1<br>2<br>3<br>.<br>. | xxx<br>xxx<br>xxx<br>.<br>. | xxx<br>xxx<br>xxx<br>.<br>. |
| 3 | x | 1<br>2<br>3<br>.<br>. | xxx<br>xxx<br>xxx<br>.<br>. | xxx<br>xxx<br>xxx<br>.<br>. |
| .<br>. | .<br>. | .<br>. | .<br>. | .<br>. |

FIG. 6

| THE UPPER LIMIT VALUE | NO. OF COMPRES-SIONS | RE-COMPRESSION CONDITION | ENCODING METHOD |
|---|---|---|---|
| X | 1 | XXX | XXX |
|  | 2 | XXX | XXX |
|  | 3 | XXX | XXX |
|  | . | . | . |
|  | . | . | . |

FIG. 7

| TYPE OF PROGRAM | THE UPPER LIMIT VALUE | NO. OF COMPRES-SIONS | RE-COMPRESSION CONDITION | ENCODING METHOD |
|---|---|---|---|---|
| 1 | x | 1<br>2<br>3<br>⋮ | xxx<br>xxx<br>xxx<br>⋮ | xxx<br>xxx<br>xxx<br>⋮ |
| 2 | x | 1<br>2<br>3<br>⋮ | xxx<br>xxx<br>xxx<br>⋮ | xxx<br>xxx<br>xxx<br>⋮ |
| 3 | x | 1<br>2<br>3<br>⋮ | xxx<br>xxx<br>xxx<br>⋮ | xxx<br>xxx<br>xxx<br>⋮ |
| ⋮ | ⋮ | ⋮ | ⋮ | ⋮ |

FIG. 9

PROGRAM RECORDING DEVICE AND METHOD OF RECORDING PROGRAM

BACKGROUND OF THE INVENTION

1. Field of the Invention

The invention relates to a program recording device which records data of a broadcast program into a hard disk.

2. Description of the Related Art

In a usual general family, a television program or the like has been recorded into a video tape by a video tape recorder (VTR). However, with a standardization of an encoding method of images or the like, a recording device recently appears which records the television program into a hard disk as data.

The device of this type is provided with a hard disk of big capacity and therefore, can record a large number of programs into the hard disk. However, there is a limit about data amount which can be recorded in the hard disk of the program recording device. Further, the hard disk of the program recording device can not be exchanged easily, unlike a video tape used for a video tape recorder.

To overcome the problem to an extent, many methods for re-compressing of data in a hard disk has been proposed to record as many programs as possible.

In Japanese Laid Open Publication No. 2000-217063, a device is disclosed which re-compresses data of programs stored in a hard disk.

According to the device, the data of the programs are re-compressed when a space area of the hard disk falls below a predetermined volume. The programs which are object of a re-compression process are selected automatically based on a priority designated by a user.

Also, In Japanese Laid Open Publication No. 2000-341627, a device is disclosed which repeats a re-compression process of data of programs in every predetermined period or performs the re-compression process when it is anticipated that there is no space area in a hard disk.

Alternatively, a device is proposed which automatically selects a program to be recorded based on designated tastes of a user (for example, designated by a keyword, a category, or the like), and it is deleted from data of a program of old recording date (and time) when a space area of a hard disk falls below a predetermined volume. In this case, data of programs which are manually designated by a user are not deleted by the above automatic deletion.

Further, in the device disclosed in Japanese Laid Open Publication No. 2000-217063, a user must designate a priority of each program for re-compression, and therefore, the user is compelled to perform a complex operation.

On the other hand, in the device disclosed in Japanese Laid Open Publication No. 2000-341627, since data of programs are re-compressed in every predetermined period or when there is no extra space in a hard disk, a user can not control a time when a re-compression process is performed, on the contrary, the data of the programs may be re-compressed to an undesirable compression rate at an undesirable moment.

Further, in a conventional device which deletes data of a program having the oldest recording date, data of a program which a user wants to keep are automatically deleted.

SUMMARY OF THE INVENTION

Therefore, it is an object of the invention to provide a program recording device which can compress data of a program recorded into a hard disk, at a desirable moment and to a desirable compression level.

Furthermore, it is an object of the invention to provide a program recording device which can designate the above flexible compressing operation by a simple operation.

According to a first aspect of the invention, there is provided a program recording device which receives a broadcast program and accumulates data of the program. The device comprises (1) a recording unit which records the data of the program, (2) a compression setting storing unit which stores, for each compressing timing, a re-compression condition which is a condition of starting a compression of a program and an encoding method used in the compression of the program, (3) a re-compression scheduler which is repeatedly activated, selects programs satisfying the re-compression condition among the recorded data of programs in the recording unit, and designates the encoding method used in the compression of the selected programs by referring to the compression setting storing unit, and (4) a re-compressing unit which compress data of the selected programs in the encoding method designated by the re-compression scheduler.

Therefore, according to the invention, the recorded data of programs are compressed in a re-compression condition and in an encoding method according to an aspect of using the data by a user. The re-compression condition and the encoding method are established for each compression timing. Thereby, the data of the programs are recorded in a desirable state for the user with maintaining enough area to record the data.

According to a second aspect of the invention, there is provided a program recording device of the first aspect. Wherein, in the compression setting storing unit, the re-compression condition and the encoding method are established for each importance of a program, and the re-compression scheduler selects programs which satisfy the re-compression condition which corresponds to an importance of each of the programs and the next compressing timing.

Therefore, recorded data of programs are compressed, in a re-compression condition and in an encoding method, for each importance of the programs according to an aspect of using the data by a user. Thereby the data of the programs are recorded in a desirable state for the user with maintaining enough area to record the data.

According to a third aspect of the invention, there is provided a program recording device of the second aspect. The device further comprises an automatic recording unit which automatically records the data of the program according to a user's taste and registers an importance representing a degree of coincidence between the user's taste and a taste of the program. Wherein, the registered importance is related to the corresponding program.

Therefore, data of the programs are compressed in a re-compression condition and in an encoding method according to a degree of coincidence with keywords. Thereby, the data of the programs are recorded in a desirable state for the user with maintaining enough area to record the data, which is apt to be short due to automatic recording.

According to a fourth aspect of the invention, there is provided a program recording device of the first aspect. Wherein, in the compression setting storing unit, the re-compression condition and the encoding method are established for each attribute of a program, and the re-compression scheduler selects programs which satisfy the re-compression condition which corresponds to an attribute of each of the program and the next compressing timing.

Therefore, according to an attribute which can be obtained from data of an EPG, data of the programs are compressed in a re-compression condition and in an encoding method. Thereby, the data of the programs are recorded in a desirable state for the user with maintaining enough area to record the data.

According to a fifth aspect of the invention, there is provided a program recording device of the fourth aspect. Wherein, the attribute includes a type of a program.

According to a sixth aspect of the invention, there is provided a program recording device of the first aspect. Wherein, the re-compression condition is a condition that a program to be processed is compressed when a predetermined period passes from when the previous compression of data of the program is performed.

According to a seventh aspect of the invention, there is provided a program recording device of the first aspect. Wherein, the upper limit value is established about the compressing timing.

According to an eighth aspect of the invention, there is provided a program recording device of the first aspect. Wherein, the encoding method includes a deletion of data of the program.

According to a ninth aspect of the invention, there is provided a program recording device of the first aspect. Wherein, the compression of data of the program is made by reducing the number of frames of image data to be displayed per a second.

According to a tenth aspect of the invention, there is provided a program recording device of the first aspect. Wherein, when image data which are included in the data of the program and are encoded by using the difference between frames are used, the compression of data of the program is made by displaying the same frames a plurality of times to reconstruct image data having less data of difference.

According to an eleventh aspect of the invention, there is provided a program recording device of the first aspect. Wherein, when image data which are included in the data of the program and include a group consisting of first frames which are independently encoded and second frames which are next to the first frames and encoded by using the difference between the frames are used, the compression of data of the program is made by increasing the number of frames consisting of the group.

According to a twelfth aspect of the invention, there is provided a program recording device of the first aspect. Wherein, the compression of data of the program is made by encoding in an encoding method which produces a volume of data less than a volume of original data before the encoding method is executed.

According to a thirteenth aspect of the invention, there is provided a program recording method which receives a broadcast program and accumulates data of the program by using a computer. The method comprises the steps of (1) recording the data of the program, (2) referring, at intervals of a predetermined period, to a re-compression condition which is a condition of starting a compression of a program and an encoding method used in the compression of the program, the re-compression condition and the encoding method being established for each compressing timing, (3) selecting programs satisfying the re-compression condition among the recorded data of programs, (4) designating the encoding method used in the compression of the selected programs, and (5) compressing data of the selected programs in the encoding method designated.

According to a fourteenth aspect of the invention, there is provided a method of the thirteenth aspect. Wherein, the re-compression condition and the encoding method are established for each importance of a program, and the selecting step selects programs which satisfy the re-compression condition which corresponds to an importance of each of the programs and the next compressing timing.

According to a fifteenth aspect of the invention, there is provided a method of the fourteenth aspect. The method further comprises the steps of (1) automatic recording the data of the program according to a user's taste, and (2) registering an importance representing a degree of coincidence between the user's taste and a taste of the program, wherein the registered importance is related to the corresponding program.

According to a sixteenth aspect of the invention, there is provided a method of the thirteenth aspect. Wherein, the re-compression condition and the encoding method are established for each attribute of a program, and the selecting step selects programs which satisfy the re-compression condition which corresponds to an attribute of each of the programs and the next compressing timing.

According to a seventeenth aspect of the invention, there is provided a method of the sixteenth aspect. Wherein, the attribute includes a type of a program.

According to an eighteenth aspect of the invention, there is provided a method of the thirteenth aspect. Wherein, the re-compression condition is a condition that a program to be processed is compressed when a predetermined period passes from when the previous compression of data of the program is performed.

According to a nineteenth aspect of the invention, there is provided a method of the thirteenth aspect. Wherein, the upper limit value is established about the compressing timing.

According to a twentieth aspect of the invention, there is provided a method of the thirteenth aspect. Wherein, the encoding method includes a deletion of data of the program.

According to a twenty-first aspect of the invention, there is provided a method of the thirteenth aspect. Wherein, the compression of data of the program is made by reducing the number of frames of image data to be displayed per a second.

According to a twenty-second aspect of the invention, there is provided a method of the thirteenth aspect. Wherein, when image data which are included in the data of the program and are encoded by using the difference between frames are used, the compression of data of the program is made by displaying the same frames a plurality of times to reconstruct image data having less data of difference.

According to a twenty-third aspect of the invention, there is provided a method of the thirteenth aspect. Wherein, when image data which are included in the data of the program and include a group consisting of first frames which are independently encoded and second frames which are next to the first frames and encoded by using the difference between the frames are used, the compression of data of the program is made by increasing the number of frames consisting of the group.

According to a twenty-fourth aspect of the invention, there is provided a method of the thirteenth aspect. Wherein, the compression of data of the program is made by encoding in an encoding method which produces a volume of data less than a volume of original data before the encoding method is executed.

According to a twenty-fifth aspect of the invention, there is provided a recording medium readable by a computer, tangibly embodying a program of instructions executable by the computer to perform a program recording method which receives a broadcast program and accumulates data of the program. The method comprises the steps of (1) recording the data of the program, (2) referring, at intervals of a predetermined period, to a re-compression condition which is a condition of starting a compression of a program and an encoding method used in the compression of the program, the re-compression condition and the encoding method being established for each compressing timing, (3) selecting programs satisfying the re-compression condition among the recorded data of programs, (4) designating the encoding method used in the compression of the selected programs, and (5) compressing data of the selected programs in the encoding method designated.

According to a twenty-sixth aspect of the invention, there is provided a computer data signal embodied in a carrier wave and representing a sequence of instructions which, when executed by a processor, cause the processor to perform a program recording method which receives a broadcast program and accumulates data of the program. The method comprises the steps of (1) recording the data of the program, (2) referring, at intervals of a predetermined period, to a re-compression condition which is a condition of starting a compression of a program and an encoding method used in the compression of the program, the re-compression condition and the encoding method being established for each compressing timing, (3) selecting programs satisfying the re-compression condition among the recorded data of programs, (4) designating the encoding method used in the compression of the selected programs, and (5) compressing data of the selected programs in the encoding method designated.

According to a twenty-seventh aspect of the invention, there is provided a program product comprising, computer readable instructions and a recording medium bearing the computer readable instructions, the instructions being adaptable to enable a computer to perform a program recording method which receives a broadcast program and accumulates data of the program. The method comprises the steps of (1) recording the data of the program, (2) referring, at intervals of a predetermined period, to a re-compression condition which is a condition of starting a compression of a program and an encoding method used in the compression of the program, the re-compression condition and the encoding method being established for each compressing timing, (3) selecting programs satisfying the re-compression condition among the recorded data of programs, (4) designating the encoding method used in the compression of the selected programs, and (5) compressing data of the selected programs in the encoding method designated.

BRIEF DESCRIPTION OF THE DRAWINGS

FIG. 2 shows a data structure diagram representing contents of a program management database used in the first embodiment of a program recording device;

FIG. 3 shows a data structure diagram of a compression setting table used in the first embodiment of the program recording device;

FIG. 5 shows a data structure diagram representing contents of the program management database when data of a program are compressed in the different re-compression period and in the different encoding method according to an importance of the program;

FIG. 6 shows a data structure diagram representing contents of the compression setting table when data of a program are compressed in the different re-compression period and in the different encoding method according to an importance of the program;

FIG. 7 shows a data structure diagram representing contents of the compression setting table when a re-compression condition is used instead of the re-compression period in compressing the data of the program;

FIG. 9 shows a data structure diagram of a compression setting table used in the second embodiment of the program recording device;

DESCRIPTION OF THE PREFERRED EMBODIMENT

First, description is made about a first embodiment of a program recording device according to the invention.

Figure 1:
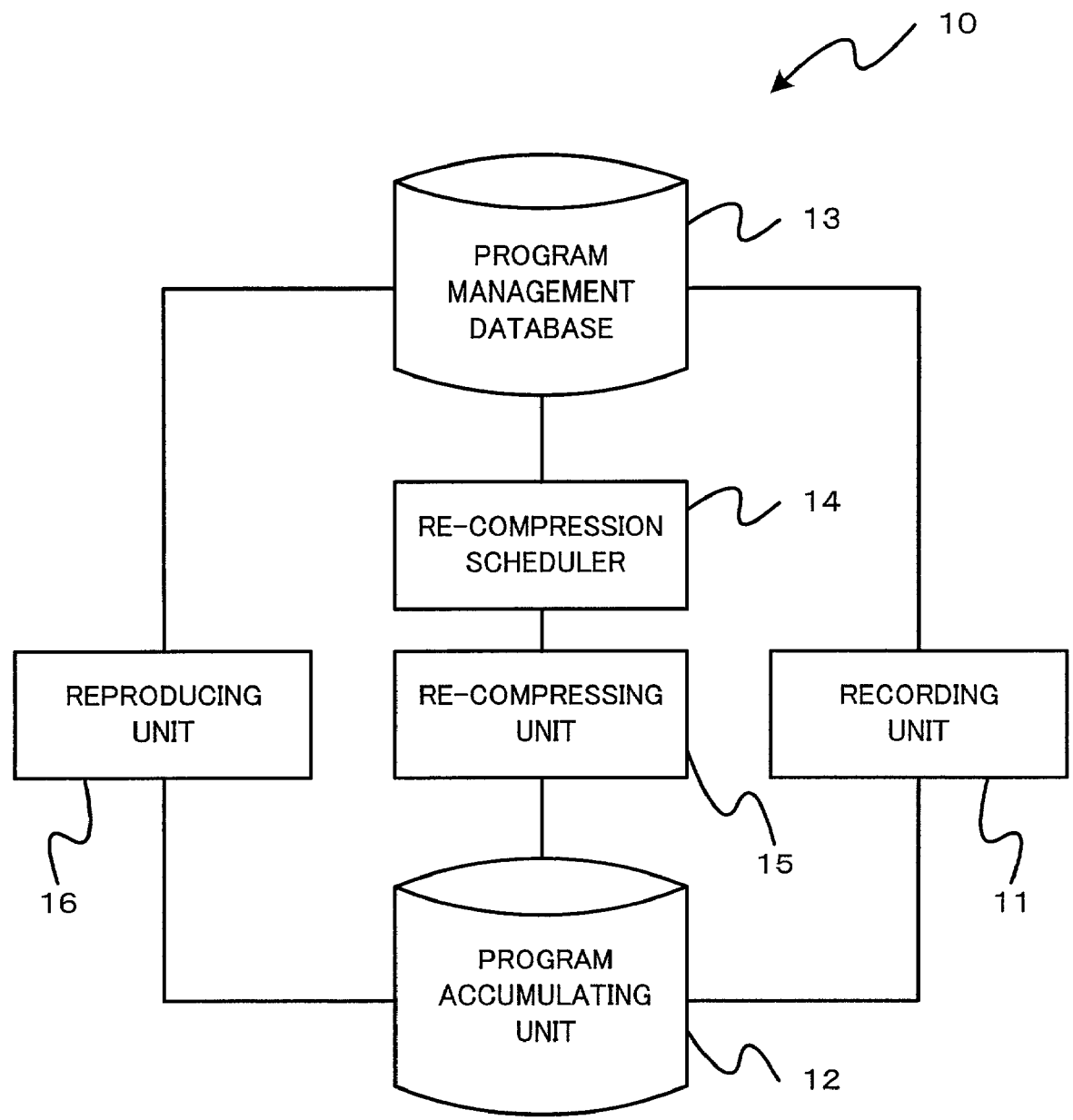
FIG. 1 shows a block diagram representing a structure of a first embodiment of a program recording device according to the invention.

In FIG. 1, the first embodiment of the program recording device 10 is shown. The program recording device 10 includes a recording unit 11, a program accumulating unit 12, a program management database 13, a re-compression scheduler 14, a re-compressing unit 15, and a reproducing unit 16.

The program recording device 10 receives programs via a ground wave broadcasting, a satellite broadcasting, or a cable of a cable television network, and records data of the programs including image data and sound data. Also, the program recording device 10 repeatedly compresses the data of the program with the progress of time.

In this case, the program recording device 10 may compress only the image data, or may compress both of the image data and the sound data.

The recording unit 11 receives programs from a ground wave, a wave from a satellite, a cable of a cable television network, and the like, encodes image signals and sound signals, and records them into the program accumulating unit 12. Also, when data of the programs are recorded into the program accumulating unit 12, the recording unit 11 registers identification information and accumulate state information of the corresponding programs into the program management database 13.

The identification information includes, for example, a broadcasting station of the program and the date and time when the broadcasting of the program is started.

The accumulate state information includes, for example, the number of compressions (compressing processes) for the recorded data of a program, the date and time when the last compressing process is performed, and an encoding method. Immediately after the data of the program are recorded, the number of compressing processes is zero, the date and time when the compression is performed are the date and time when the data of the program are recorded, and the encoding method is a method (or format) of the data of the program.

The program accumulating unit 12 is, for example, a magnetic disk storage. The data of the program are recorded into the unit 12. Also, for example, a hard disk or a semiconductor memory may be used as the unit 12.

The program management database 13 stores, as shown in FIG. 2, identification information and accumulate state information of programs recorded into the program accumulating unit 12, for each program.

The re-compression scheduler 14 has a compression setting table as shown in FIG. 3. The compression setting table includes the number of compressions (compressing processes), an encoding method (compressing method) used in the compression, a duration to be kept from when the previous compression is made to when the present compression is made (hereinafter, referred to as "re-compression period"), and the upper limit value of the number of compressing processes. The encoding method of each compression is, for example, set to "MPEG2" when recorded, then set to "MPEG1" when the number of compressing processes is one, and set to "MPEG4" when the number of compressing processes is two. In this case, the encoding method must be selected so that an amount of the data of the program is gradually reduced. Herein, a combination of the number of compressing processes and the encoding method is referred to as an "entry".

The re-compression scheduler 14 also has a calendar clock to manage the date and time, and performs a re-compressing process at intervals of a predetermined period (for example, several hours, several days, several weeks, or the like). In the re-compressing process, the scheduler 14 performs a predetermined compressing process for data of a program when a re-compression period of the program passed. Therefore, it is desirable that an interval time which the scheduler 14 repeats a re-compressing process is shorter enough than the re-compression period.

Also, the upper limit value is established about the number of compressing processes, the scheduler 14 does not perform further compressing process when the number of compressing processes reaches the upper limit value. Further, the scheduler 14 manages whether a re-compressing process is performed for each program or not by using a temporary table, while the re-compressing process is performed. An interval of repeating the re-compressing process, a re-compression period, and the upper limit value of the number of compressing processes are each designated by a parameter, and the parameter can be changed by a user.

Figure 11:
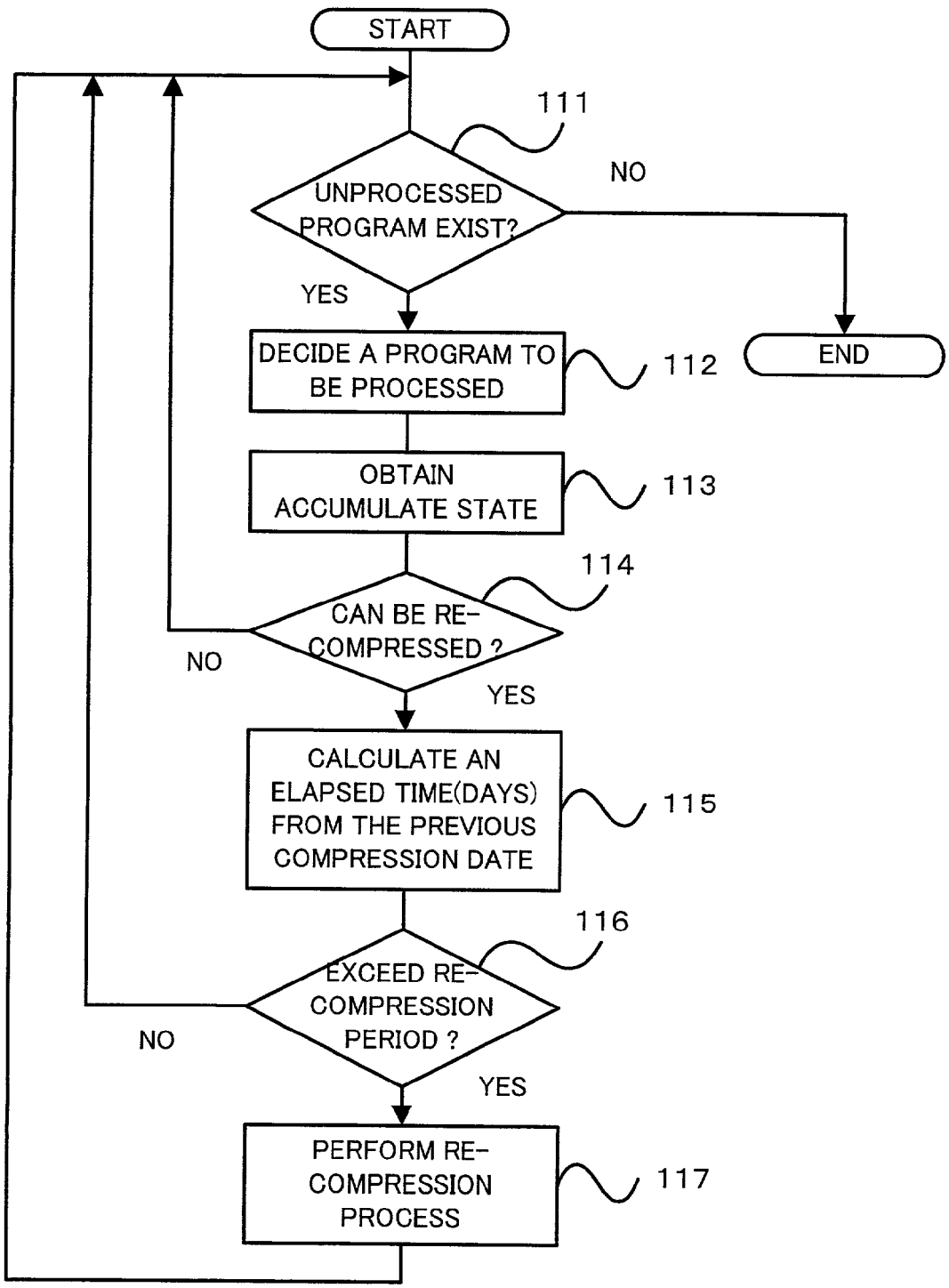
FIG. 11 shows a flowchart representing a re-compressing process of the first embodiment of the invention.

Referring to FIG. 11, in re-compressing process, the re-compression scheduler 14 firstly refers to the temporary table and determines whether there is an unprocessed program in the program management database 13 (step 111). If there is no unprocessed program, the scheduler 14 terminates the re-compressing process. If unprocessed program exists, the scheduler 14 determines a program to be processed (step 112).

Then, the scheduler 14 fetches accumulate state information of the program from the program management database 13 (step 113). Next, the scheduler 14 determines whether a re-compressing process can be performed or not by comparing the number of compressing processes of the program with the upper limit value (step 114). The upper limit value is stored in the compression setting table. If the scheduler 14 determines that the re-compressing process cannot be performed, the scheduler 14 registers the program in the temporary table as a processed program and returns to step 111.

If the re-compressing process can be performed, the scheduler 14 calculates an elapsed time from the date and time when a compressing process is previously performed to the present time (step 115).

The date and time when a compressing process is previously performed can be obtained from the accumulate state information shown in FIG. 2.

Then, the scheduler 14 refers to the compression setting table and determines whether the calculated elapsed time falls within the re-compression period (step 116). If the elapsed time is shorter than the re-compression period, the scheduler 14 registers the program in the temporary table as a processed program and returns to step 111.

Since the re-compression period can be established for each compressing timing, for example, if the present compression is the first compression about the program, a re-compression period corresponding to the first compression must be referred for the determination.

The compression timing corresponds to the number of compressing (compressing processes) stored in the program management database or the compression setting table.

If the elapsed time exceeds the re-compression period, the re-compression scheduler 14 designates a program to be compressed and an encoding method used in a compressing process, and instructs the re-compressing unit 15 to compress data of the program (step 117). Then, the scheduler 14 registers the program in the temporary table as a processed program and returns to step 111.

Figure 4:
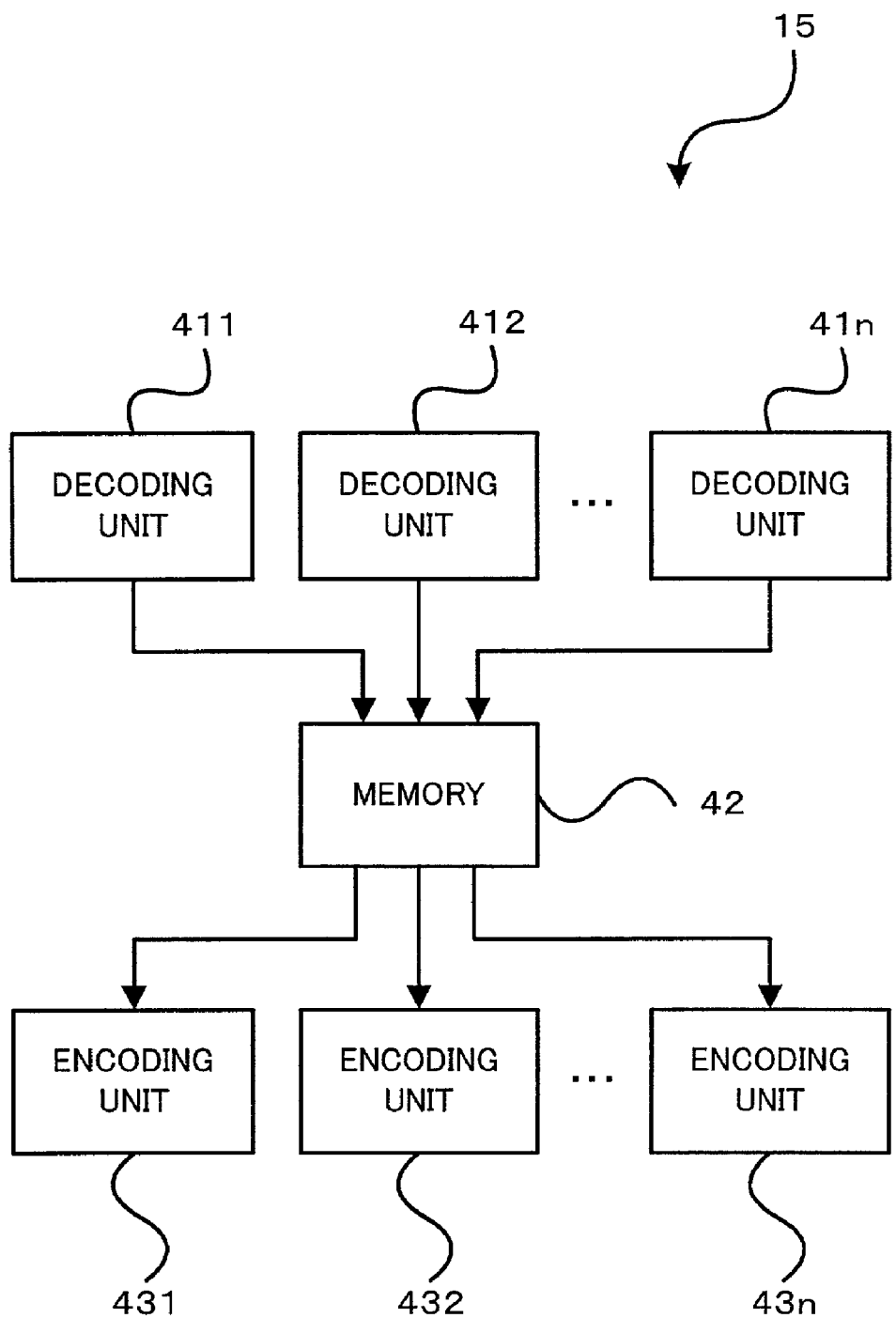
FIG. 4 shows a block diagram of a re-compressing unit according to the first embodiment of the invention.

The re-compressing unit 15 includes, as shown in FIG. 4, decoding units 411, 412, . . . , 41$n$, a memory 42, and encoding units 431, 432, . . . , 43$n$. The re-compressing unit 15 compresses the data of the program designated by the re-compression scheduler 14, and increments the number of compressing processes in the program management database by one and updates the date and time when the compressing process is performed.

The decoding units 411, 412, . . . , 41$n$ fetch the data of the program designated by the re-compression scheduler 14 from the program accumulating unit 12, decode them, and record the decoded data into the memory 42. The memory 42 stores the decoded data of the program. The encoding units 431, 432, . . . , 43$n$ compress the decoded data of the program stored in the memory 42 in the designated encoding method, and record the compressed data in the program accumulating unit 12. To simultaneously process data of a plurality of programs, or to simultaneously process a plurality of parts obtained by dividing a program, the plurality of decoding units and the plurality of encoding units are prepared. Therefore, if it is not required to process the plurality of programs or the plurality of divided parts simultaneously, a single decoding unit and a single encoding unit may be prepared.

Figure 12:
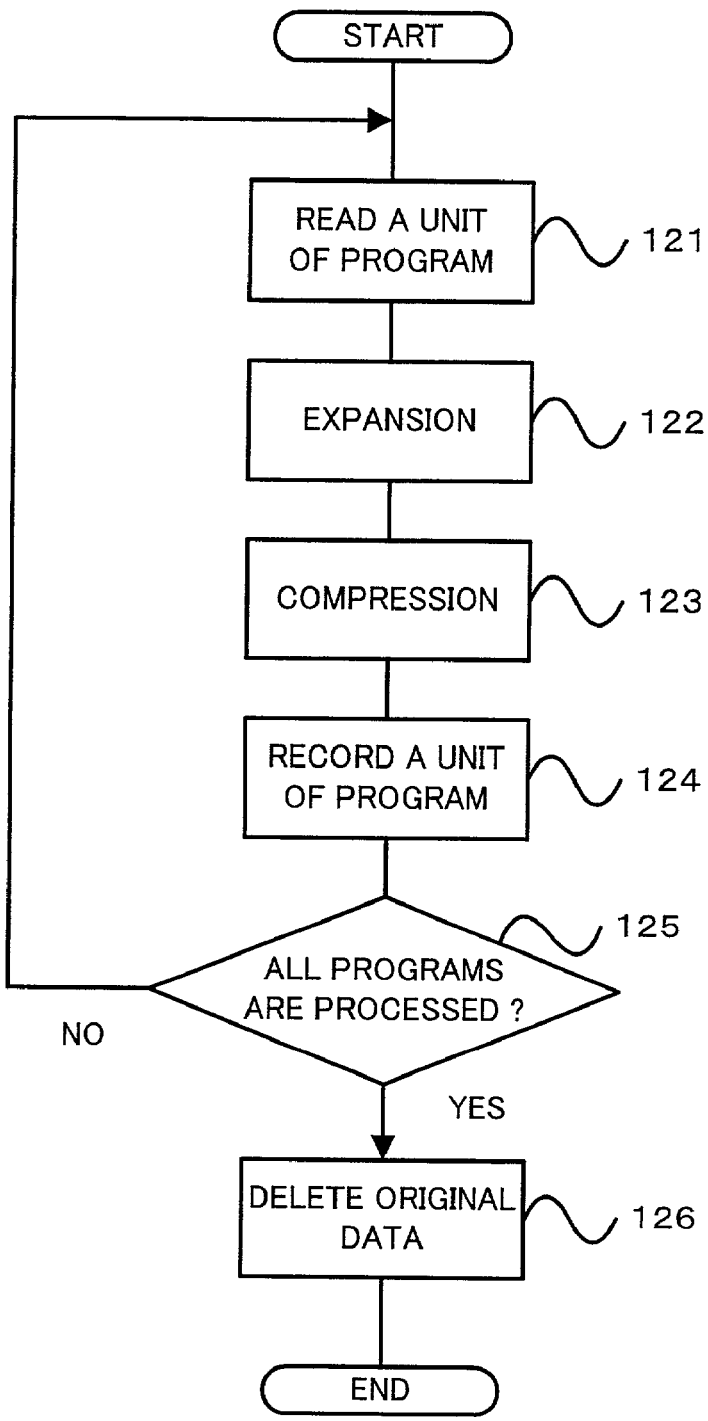
FIG. 12 shows a flowchart representing a process of a re-compression scheduler of the first embodiment of the invention.

As shown in FIG. 12, the re-compressing unit 15 fetches data of the designated program from the program accumulating unit 12 in a predetermined fetch unit in response to reception of the instruction from the re-compression scheduler 14 (step 121). Herein, the predetermined fetch unit may be a frame or a GOP (Group of Pictures). The GOP is a set of frames including first frames which are represented as data of independent frames (I pictures) and second frames which are next to the I pictures and are represented by the difference from the previous frame.

Then, the re-compressing unit 15 decodes the fetched data of the program and stores them into the memory 42 (step 122). Next, the unit 15 compresses the decoded data in the encoding method designated by the re-compression scheduler 14 (step 123). The unit 15 records the compressed data of the program into the program accumulating unit 12 (step 124).

Then, the re-compressing unit 15 determines whether all of the data of the program are compressed or not (step 125). If all of the data of the program are compressed, the re-compressing unit 15 deletes the original data of the program from the program accumulating unit 12 (step 126), and terminates the process.

If compressing process of the data of the program is not completed, the re-compressing unit 15 returns to step 121 and repeats the process.

The reproducing unit 16 fetches image data and sound data of a program stored in the program accumulating unit 12 by a user's request, decodes the fetched data, and reproduces the decoded data. The image data are reproduced and displayed on a screen of a television set or a display device. The sound data are reproduced and output from a loudspeaker of a television set or a loudspeaker device.

The recording unit 11 of the program recording device 10 according to the first embodiment of the invention registers identification information and accumulate state information of a program into the program management database 13 when the program is recorded. Then, the re-compression scheduler 14 of the device 10 determines a program which exceeds a re-compression period (in other words, when a re-compression period passed from a recorded time or the previous compressed time of a program) as a program to be compressed and performs a compressing process for the determined program at intervals of a predetermined period. The re-compression period can be established by a user.

Therefore, according to the program recording device 10, the data of the program accumulated in the program accumulating unit 12 are compressed at intervals of the re-compression period which is suitably established by a user, considering how the data of the program are used by the user. Therefore, the data of the program can be recorded in a condition which is suitable for a user, with keeping an area to accumulate additional data of the program.

Further, in the embodiment, although all of the data of the programs are processed by using the same re-compression period and the same encoding method, the programs may be classified based on an importance of each program and according to the importance, different re-compression periods and different encoding methods may be used. The importance means a degree that a user want to keep image data and sound data of the program in a high quality.

In FIGS. 5 and 6, structures are shown about a program management database and a compression setting table when a compressing process is performed in the different re-compression periods and the different encoding methods for each importance of the program.

As shown in FIG. 6, the compression setting table stores entries, in advance, each of which includes a re-compression period and an encoding method, for each importance.

For example, a user establishes the importance when data of the program are recorded or a recording of the program is reserved. The recording unit 11 registers the importance in the program management database as shown in FIG. 5.

Figure 13:
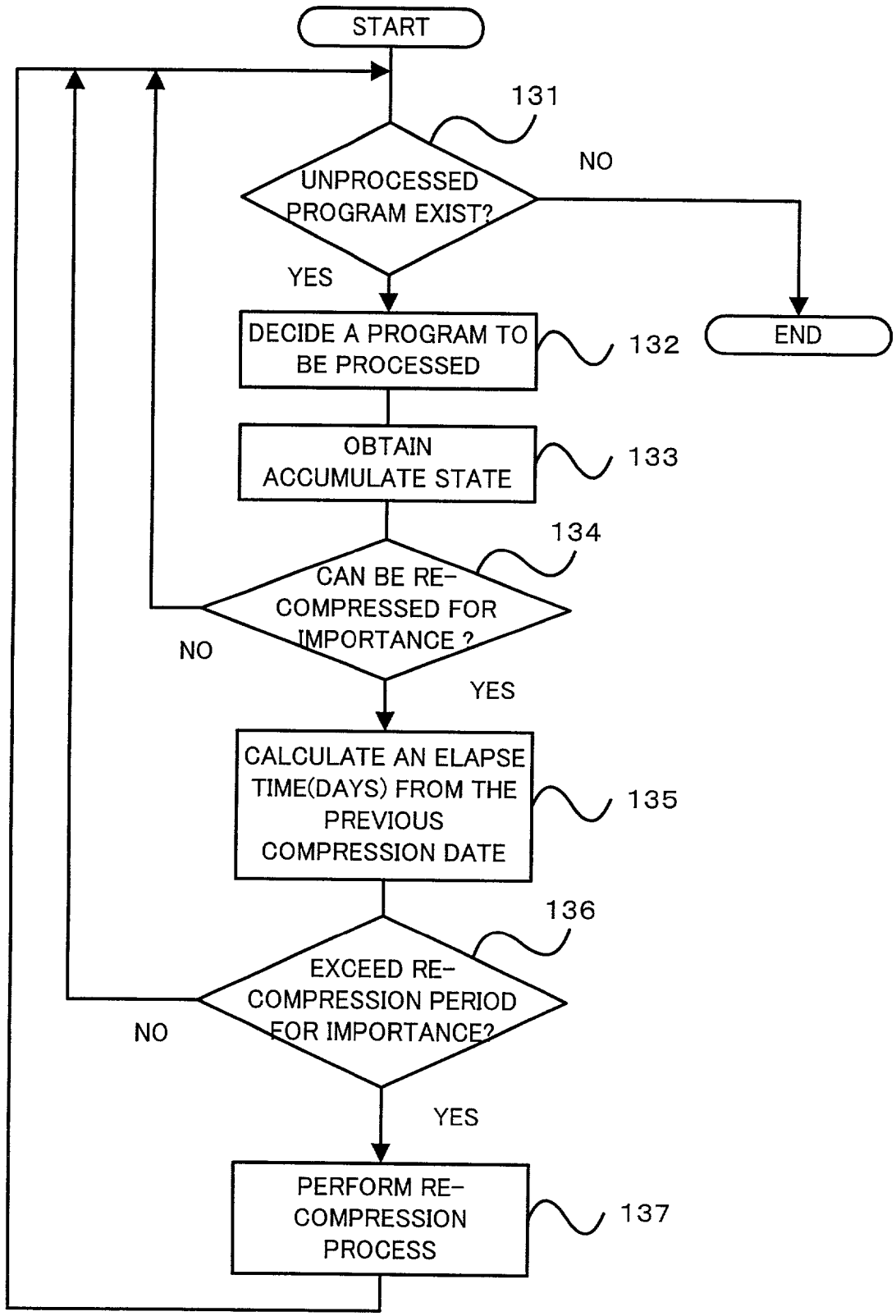
FIG. 13 shows a flowchart representing a process of the re-compression scheduler when data of a program are compressed in the different re-compression period and in the different encoding method according to an importance of the program.

Referring to FIG. 13, in a re-compressing process, the re-compression scheduler 14 firstly determines whether there is an unprocessed program or not (step 131). If there is at least one unprocessed program, the scheduler 14 determines a program to be processed (step 132).

Then, the scheduler 14 fetches accumulate state information of the program from the program management database (step 133). The scheduler 14 determines whether the number of compressing processes exceeds the upper limit value of the corresponding importance or not. The scheduler 14 determines that a re-compressing process can be performed about the program if the number of compressing processes falls within the upper limit value (step 134 (yes)). Otherwise, the scheduler 14 registers the program as a processed program and returns to step 131.

If a re-compressing process can be performed, the scheduler 14 calculates an elapsed time from when the previous compressing process is performed to the present time (step 135), and determines whether or not the elapsed time exceeds a re-compression period of an importance of the corresponding program, with reference to the compression setting table (step 136).

If the elapsed time does not exceed a re-compression period corresponding to an importance (and to the number of compressions), the scheduler 14 registers the program as a processed program and returns to step 131.

If the elapsed time exceeds a re-compression period corresponding to an importance (and to the number of compressions), the scheduler 14 instructs the re-compressing unit to compress the data of the program by designating the program to be compressed and an encoding method used in the compressing process (step 137), and registers the compressed program as a processed program and returns to step 131.

Therefore, the data of the program accumulated in the program accumulating unit 12 are compressed at intervals of a re-compression period which is established in advance by a user for each importance of the program, according to how the user uses the data of the program.

Also, in this embodiment, although the program recording device 10 compresses data of a program which has not been compressed within a re-compression period, a re-compression condition may be used instead of the re-compression period.

Herein, the re-compression condition is a condition to perform the present compressing process. The re-compression period is included in the re-compression condition.

Also, the re-compression condition can be made that a program to be compressed is compressed when compressing processes more than the number of compressions about the program to be processed have been performed for all programs each of which has an importance lower than that of the program to be compressed.

Further, the re-compression condition can be made that a program to be compressed is compressed when all of programs each of which has an importance lower than that of the program to be compressed have the number of compressing processes exceeding the upper limit value.

Still further, the re-compression condition can be made that a program to be compressed is compressed when there is at least one program which has an importance higher than that of the program to be compressed and which has the number of compressing processes exceeding the number of compressing processes of the program to be processed.

Further, the re-compression condition can be made that a compressing process is performed for programs when a space area of the program accumulating unit 12 falls below a predetermined threshold value. In this case, the threshold value may be a constant value which is established in advance, or may be parameter which can be selected by a user.

Also, the re-compression condition can be made that a compressing process is performed when a space area of the program accumulating unit 12 becomes less than an amount of data of programs which are reserved to record. In addition, some of the above conditions may be combined to form a re-compression condition.

Referring to FIG. 7, a structure is shown about a compression setting table when a re-compression condition is used instead of a re-compression period.

Figure 14:
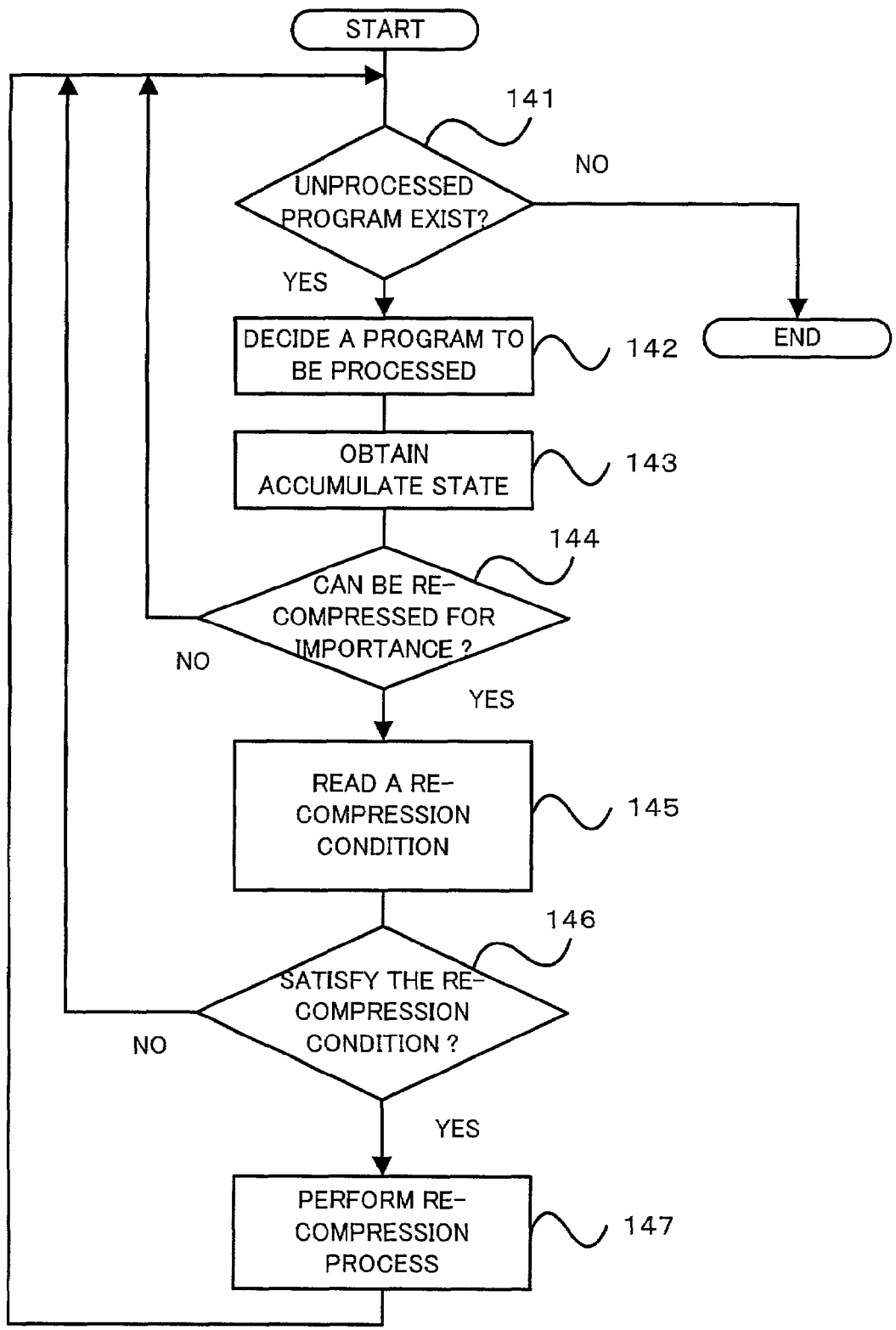
FIG. 14 shows a flowchart representing a process of the re-compression scheduler when a re-compression condition is used instead of the re-compression period in compressing the data of the program.

Next, referring to FIG. 14, in a re-compressing process, the re-compression scheduler 14 firstly determines whether there is an unprocessed program or not (step 141). If there is no unprocessed program, the compressing process is terminated. If there is at least one unprocessed program, the scheduler 14 determines a program to be compressed (step 142).

Then, the scheduler 14 fetches accumulate state information of the program from the program management database (step 143). The scheduler 14 determines whether the number of compressing processes of the program exceeds the upper limit value or not. The scheduler 14 determines that a re-compressing process can be performed about the program if the number of compressing processes falls within the upper limit value (step 144 (yes)). Otherwise, the scheduler 14 registers the program as a processed program and returns to step 141.

If a re-compressing process can be performed, the scheduler 14 reads a re-compression condition corresponding to the next compressing time of the program (step 145), and determines whether the re-compression condition is satisfied or not (step 146).

If the re-compression condition is not satisfied, the scheduler 14 registers the program as a processed program and returns to step 141.

If the re-compression condition is satisfied, the scheduler 14 instructs the re-compressing unit to compress the data of the program by designating the program to be compressed and an encoding method used in the compressing process (step 147), and registers the compressed program as a processed program and returns to step 141.

Therefore, the data of the program accumulated in the program accumulating unit 12 are compressed referring to a re-compression condition which is established in advance by a user according to how the user uses the data of the program.

Also, in the program recording device 10 of the embodiment, the compression setting table can include "deletion" as an encoding method. Herein, the "deletion" means an instruction of deleting image data and sound data of a program to be processed, from the program accumulating unit 12. In this case, the re-compression scheduler 14 deletes the data of the program from the program accumulating unit 12 at step 111 in FIG. 11 instead of performing re-compressing process, and deletes information of the program to be processed from the program management database 13.

Therefore, it is possible to prevent from filling the program accumulating unit 12 with compressed data, since the compressed data of programs are finally deleted.

Although the program recording device 10 of the embodiment compresses data of a program by transforming original data into an encoding format of data which have less amount of data than an amount of the original data, such the compression can be realized by gradually reducing a frame rate of the data of the program.

In this case, the compression setting table includes a frame rate instead of an encoding method. The re-compression scheduler 14 designates a program to be processed and a frame rate of compressed data, when the scheduler 14 instructs the re-compressing unit 15 to compress the program.

When the re-compressing unit 15 receives the instruction, the unit 15 fetches the data of the program form the program accumulating unit 12 for each fetch unit and decodes the fetched data, and records the decoded data into the program accumulating unit 12 in the designated frame rate (lower frame rate) and deletes the data of the program originally stored in the program accumulating unit 12.

When the unit 15 records the decoded data into the program accumulating unit 12 in the lower frame rate, that is, when a frame rate is transformed, the unit 15 firstly calculates a rate of frames which will be partly deleted by using frame rates after and before the transformation. Then, the unit 15 transforms the frame rate of the data of the program by partly deleting frames from the data at the calculated rate. Next, the unit 15 decodes the data of the program in which the frame rate is reduced and records the decoded data into the program accumulating unit 12. Then the unit 15 deletes the original data of the program from the program accumulating unit 12 after a compressing process is completed for whole data of the program.

For example, it is assumed that a frame rate of image data before the transformation is 30 frames per a second and a frame rate of image data after the transformation is 15 frames per a second, re-compressing unit 15 deletes a frame every two frames. Also, the unit 15 deletes adjacent two frames and leaves the next adjacent two frames, when the image data are for interlace.

Also, when an encoding method which encodes data by using difference data between frames, such as MPEG is used, the program recording device 10 may compress the data by continuously using the same frame.

In this case, the compression setting table includes the number of frames made to continue instead of an encoding method. Also, The re-compression scheduler 14 designates a program to be processed and the number of frames made to continue, when the scheduler 14 instructs the re-compressing unit 15 to compress the program.

When the re-compressing unit 15 receives the instruction, the unit 15 fetches the data of the program form the program accumulating unit 12 for each predetermined unit and decodes the fetched data, and transforms the decoded data into the image data in which the same frame continues for the designated number of frames. The unit 15 then encodes the transformed data and records the encoded data into the program accumulating unit 12. Then the unit 15 deletes the data of the program originally stored in the program accumulating unit 12.

When a frame rate is reduced, the re-compressing unit 15 firstly changes images of a sequence of frames of the designate number of frames made to continue, into an image of the beginning of the sequence of frames. Thereby, frames each of which has the same image data continue for the designated number of frames. Then the unit 15 encodes the image data again and records the encoded data into the program accumulating unit 12. The unit 15 further deletes the original data of the program from the program accumulating unit 12 after a compressing process is completed for whole data of the program.

Also, when an encoding method which encodes data by using difference data between frames, such as MPEG is used, the program recording device 10 may compress the image data by connecting a plurality of GOPs to generate a GOP.

In this case, the compression setting table includes the number of GOPs to be connected instead of an encoding method. Also, The re-compression scheduler 14 designates a program to be processed and the number of GOPs to be connected, when the scheduler 14 instructs the re-compressing unit 15 to compress the program.

When the re-compressing unit 15 receives the instruction, the unit 15 fetches the data of the program form the program accumulating unit 12 for each predetermined unit and decodes the fetched data, and transforms GOPs of the designated number into a GOP. The unit 15 then encodes the transformed data and records the encoded data into the program accumulating unit 12. Then the unit 15 deletes the data of the program originally stored in the program accumulating unit 12.

When the plurality of GOPs are gathered into a GOP, the re-compressing unit 15 firstly decodes frames included in the plurality of GOPs. Then the unit 15 encodes the decoded frames as a GOP, and records the GOP into the program accumulating unit 12. The unit 15 further deletes the data of the program originally stored in the program accumulating unit 12, after the compressing process is completed for whole data of the program.

The program recording device 10 can reduce an amount of image data since the device 10 can reduce a rate of I pictures to whole data of the program to be processed. Herein, although it is illustrated that a plurality of GOPs are gathered into a GOP, if a rate of I pictures can be reduced, the GOP can be divided in the different manner from a manner of dividing of the original GOPs.

Also, the re-compressing unit 15 reads image data from the program accumulating unit 12 and calculates the number of frames of GOP so that whole data amount becomes minimum. After that, the unit can reconstruct GOP based on a result of the calculation. Also, it is considered that if GOP is divided at points changing scene or the like, an amount of data can be reduced as a whole.

Each of the recording unit 11, re-compressing unit 13, the re-compression scheduler 14, and the reproducing unit 16 of the embodiment can be also realized by making a processor execute a computer program to perform a process corresponding to each function.

Next, description is made about a program recording device according to a second embodiment of the invention.

Figure 8:
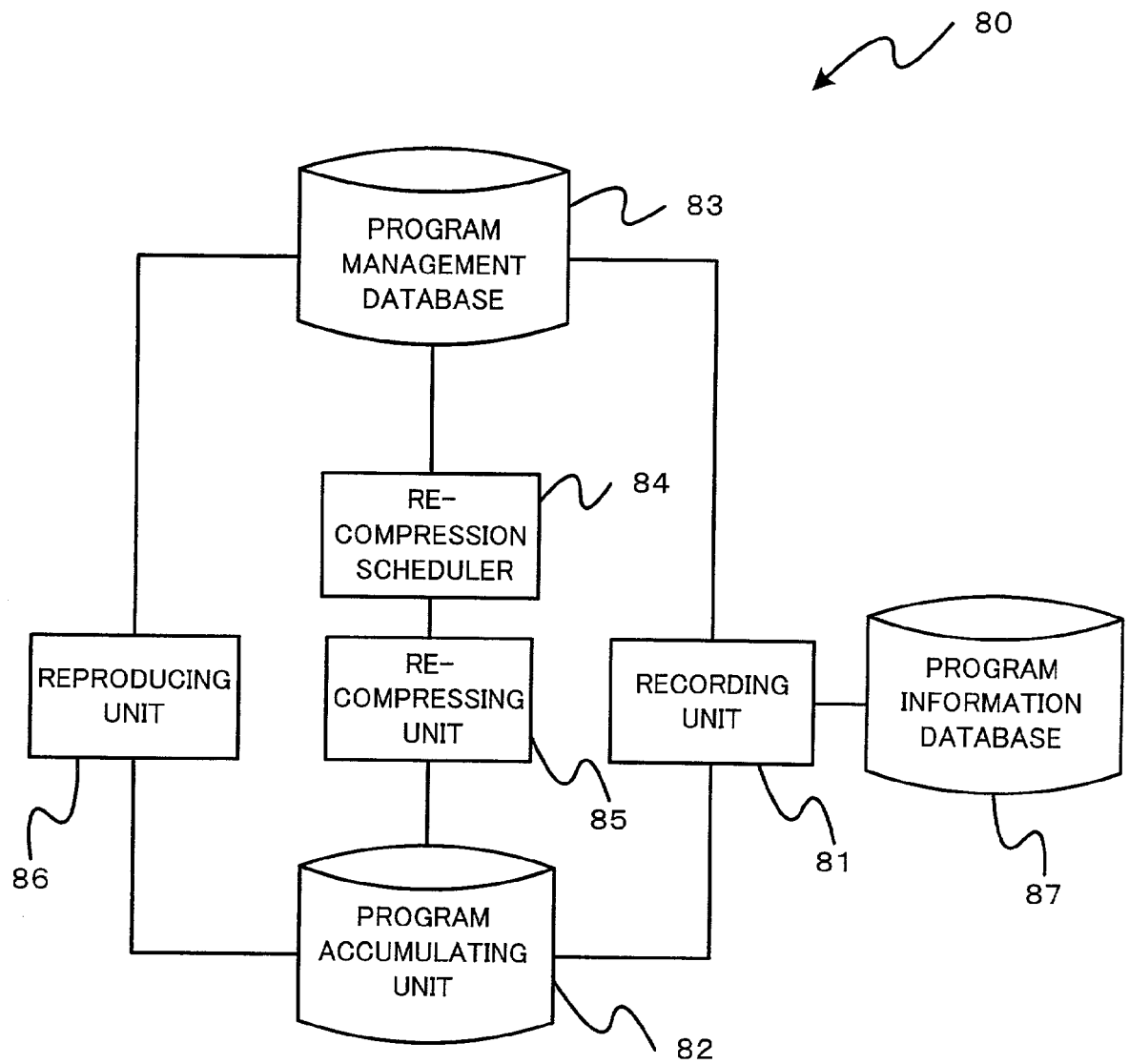
FIG. 8 shows a block diagram representing a structure of a second embodiment of a program recording device according to the invention.

As shown in FIG. 8, the program recording device 80 according to the second embodiment of the invention includes a recording unit 81, a program accumulating unit 82, a program management database 83, a re-compression scheduler 84, a re-compressing unit 85, a reproducing unit 86, and a program information database 87.

The program recording device 80 uses an electronic program guide (hereinafter, referred to as "EPG") which includes a program title, performers, and related information (hereinafter, referred to as program information) such as a type (genre) of the program, for each program. For example, data of the EPG are sent (broadcast) with data of a program via a ground wave, a satellite wave, or a cable of a cable television network.

Herein, the type (genre) of the program is, for example, a comedy, a drama, a sports, a news, and so on.

The program recording device 80 receives and stores the data of the EPG in advance.

The program recording device 80 refers to the data of the EPG and stores the type of the program or the like, when the decide 80 receives the broadcast program and records image data and sound data of the program. The program recording device 80 compresses a program at the different time points and in the different encoding methods according to the type of the program, when the data of the program are repeatedly compressed with the progress of time.

The recording unit 81 receives programs, encodes image signals and sound signals, and records them into the program accumulating unit 82. Also, the recording unit 81 registers identification information, accumulate state information, and attribute of a program into the program management database 83 when data of the program are recorded into the program accumulating unit 82.

The identification information includes a broadcasting station of the program and the date and time when the broadcasting of the program is started.

The accumulate state information includes the number of compressing processes for the recorded program, the date and time when the last compressing process is performed, and an encoding method. Immediately after the data of the program are recorded, the number of compressing processes is zero, the date and time when the compressing process is performed are the date and time when the data of the program are recorded, and the encoding method is a format of the data of the program.

The attribute includes a type of the program, audience information representing whether a user watches the program or not, the number of times that a user watched a program, and copy information representing whether a user copies the program to the other are or a storage medium or not. Immediately after the data of the program are recorded, the number of times that a user watched a program is zero.

The program accumulating unit 82 is, for example, a magnetic disk storage. The data of the program are recorded into the unit 82. Also, for example, a hard disk or a semiconductor memory may be used as the unit 82.

The program management database 83 stores the identification information, the accumulate state information, and the attribute of programs recorded into the program accumulating unit 82, for each program.

The re-compression scheduler 84 has a compression setting table as shown in FIG. 9. The compression setting table includes the number of compressing processes, an encoding method (compressing type) used in the compression, a re-compression condition, and the upper limit value of the number of compressing processes, for each type of program.

Herein, the re-compression condition is a condition to perform the present compressing process, and includes the above mentioned re-compression period.

Herein, the re-compression condition is a condition to perform the present compressing process. The re-compression period is included in the re-compression condition.

Also, the re-compression condition can be made that a compressing process is performed for a program based on whether or not the program to be compressed has been copied in the other area or a storage medium.

Further, the re-compression condition can be made that a compressing process is performed for a program based on whether or not a user has watched the program to be compressed.

Still further, the re-compression condition can be made that a compressing process is performed for a program based on whether or not a user has watched the program to be compressed more than a predetermined times.

Also, the re-compression condition can be made that a compressing process is performed for a program when a space area of the program accumulating unit 82 falls below a predetermined threshold value. In this case, the threshold value may be a constant value which is established in advance, or may be parameter which can be selected by a user.

Also, the re-compression condition can be made that a compressing process is performed when a space area of the program accumulating unit 12 becomes less than an amount of data of programs which are reserved to record. In addition, some of the above conditions may be combined to form a re-compression condition.

The re-compression scheduler 84 also has a calendar clock to manage the date and time, and performs a re-compressing process at intervals of a predetermined period (for example, several hours, several days, several weeks, or the like). In the re-compressing process, the scheduler 84 refers to a compression setting table, and performs a predetermined compressing process for data of a program if a re-compression condition corresponding to a type of the program is satisfied.

Figure 15:
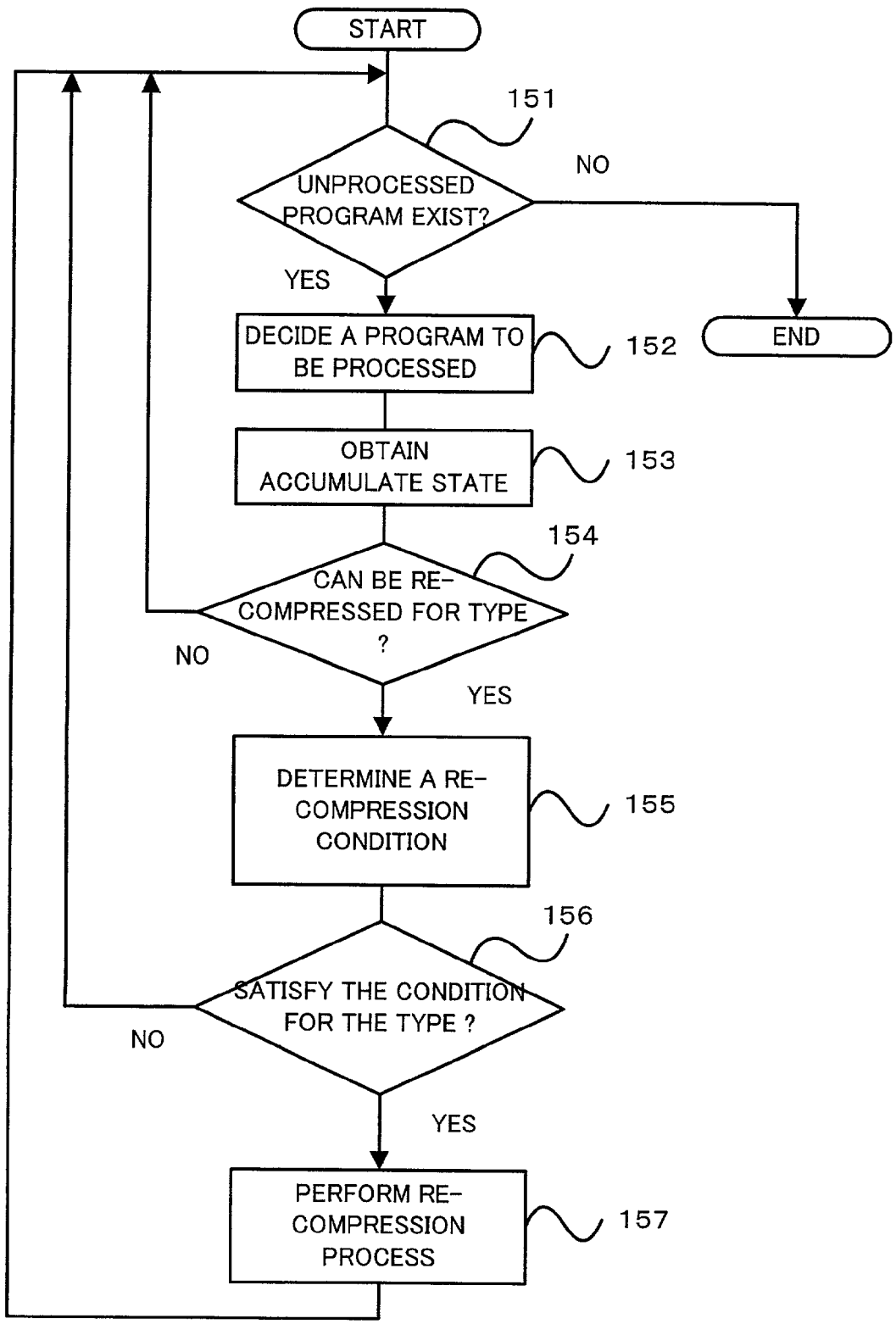
FIG. 15 shows a flowchart representing a process of a re-compression scheduler of the second embodiment of the invention.

Referring to FIG. 15, in re-compressing process, the re-compression scheduler 84 firstly determines whether there is an unprocessed program (step 151). If there is no unprocessed program, the re-compressing process is terminated. If there is at least one unprocessed program, the scheduler 84 determines a program to be processed (step 152).

Then, the scheduler 84 fetches accumulate state information of the program and a type of the program from the program management database 13 (step 153). Next, the scheduler 84 determines whether a re-compressing process can be performed or not by comparing the number of compressing processes of the program with the upper limit value (step 154). If the scheduler 84 determines that the re-compressing process cannot be performed, the scheduler 84 registers the program as a processed program and returns to step 151.

If the re-compressing process can be performed, the scheduler 84 calculates an elapsed time from the date and time when the previous compressing process is performed to the present time (step 155). Then, the scheduler 84 refers to the compression setting table and determines whether the calculated elapsed time falls within the re-compression period corresponding to a type of the program (step 156).

If the elapsed time is shorter than the re-compression period, the scheduler 84 registers the program as a processed program and returns to step 151.

If the elapsed time exceeds the re-compression period, the re-compression scheduler 84 designates a program to be compressed and an encoding method used in a compressing process, and instructs the re-compressing unit 85 to compress data of the program (step 157). Then, the scheduler 84 registers the program as a processed program and returns to step 151.

The re-compressing unit 85 compresses the data of the program designated by the re-compression scheduler 84, and increments the number of compressing processes in the program management database 83 by one and updates the date and time when the compressing process is performed.

The reproducing unit 86 fetches image data and sound data of a program stored in the program accumulating unit 82 by a user's request, and reproduces the decoded data. The reproducing unit 86 updates program information in the program information database 87.

The program information database 87 stores the program information of EPG.

Therefore, a compression process can be performed according to a degree of user's taste about programs, by classifying the programs based on types (genres) of the programs.

Also, in the second embodiment, although a re-compressing process is illustrated which is performed in the different time points and in the different encoding method for each type of the program, it can be controlled so that the re-compressing process is performed for the specific type of the program.

Thereby, only a predetermined type of program can be compressed, or programs belonging to types which are other than a predetermined type can be compressed.

Next, description is made about a program recording device according to a third embodiment of the invention.

In conventional program recording devices which uses data of the EPG, there are some program recording devices which searches the data of the EPG for user's favorite programs by using keywords or types which are established in advance by the user, extracts the searched programs, and automatically records the extracted programs. In such the program recording devices which automatically records programs, the different re-compression period and the different encoding method can be established between a program which is automatically recorded and a program which is directly recorded or recorded by using a recording reservation function.

Figure 10:
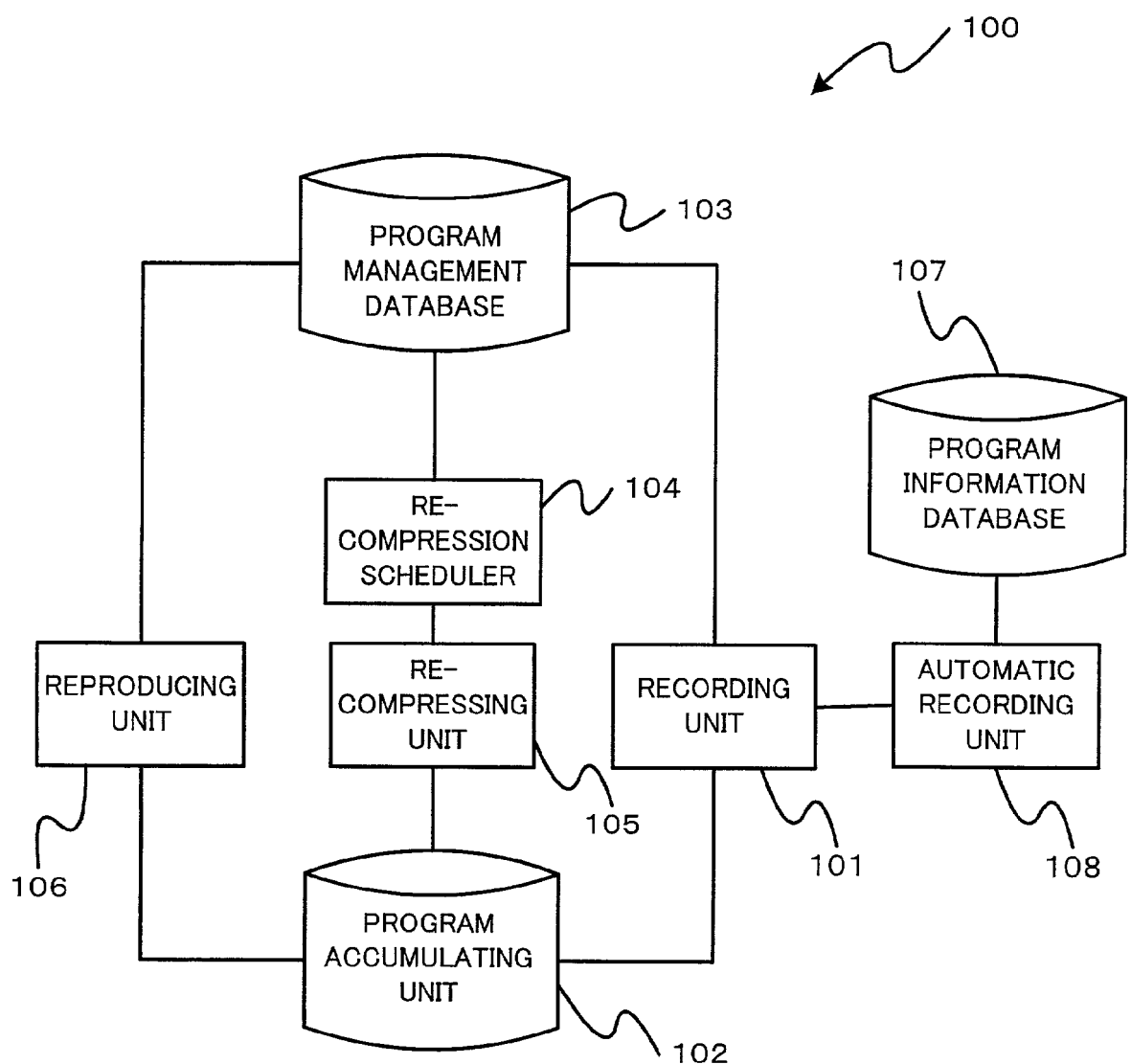
FIG. 10 shows a block diagram representing a structure of a third embodiment of a program recording device according to the invention.

As shown in FIG. 10, a program recording device 100 which has an automatic program recording function includes a recording unit 101, a program accumulating unit 102, a program management database 103, a re-compression scheduler 104, a re-compressing unit 105, a reproducing unit 106, a program information database 107, and an automatic program recording unit 108.

The program recording device 100 uses data of an EPG which represents program information for each program. The device 100 records a program based on a direct instruction by a user or a recording reservation instructed by a user (hereinafter, such the recording is referred to as "designated recording"). In addition, the device 100 searches the data of the EPG for user's favorite programs by using keywords or types which are established in advance by the user, extracts the searched programs, and automatically records the extracted programs (hereinafter, such the recording is referred to as "automatic recording"). The device 100 records whether a recorded program is recorded by the designated recording or the automatic recording, when the program is received and image data and sound data of the program are recorded. Also, a degree of coincidence between data of an EPG about the recorded program and keywords designated by a user is recorded, when the designated recording is made. The device 100 compresses the recorded program at intervals of the different periods and in the different encoding methods, according to whether the automatic recording is done or not and the degree of the coincidence, when data of the program are compressed repeatedly with the progress of time.

The recording unit 101 receives programs, encodes image signals and sound signals, and records them into the program accumulating unit 102. Also, the recording unit 101 registers identification information, accumulate state information, and attribute of the program into the program management database 103 when data of the program are recorded into the program accumulating unit 102.

The attribute includes an identifier representing whether the recording is based on designated recording or automatic recording, and a degree of coincidence between data of an EPG about the program and keywords designated by a user.

The recording unit 101 registers an identifier representing that the program is recorded by the automatic recording into the attribute of the program, when the unit 101 records the program in response to an instruction from the automatic recording unit 108.

The program accumulating unit 102 is, for example, a magnetic disk storage. The data of the program are recorded into the unit 102. Also, for example, a hard disk or a semiconductor memory may be used as the unit 102.

The program management database 103 stores the identification information, the accumulate state information, and the attribute of programs recorded into the program accumulating unit 102, for each program.

The re-compression scheduler 104 has a compression setting table. The compression setting table includes the number of compressing processes, an encoding method (compressing type) used in the compression processes, a re-compression condition, and the upper limit value of the number of compressing processes, for each importance of a program.

The re-compression scheduler 104 also has a calendar clock to manage the date and time, and performs a re-compressing process at intervals of a predetermined period (for example, several hours, several days, several weeks, or the like). In the re-compressing process, the scheduler 104 refers to a compression setting table, and performs a predetermined compressing process for data of a program if a re-compression condition corresponding to a type of the program is satisfied.

Figure 16:
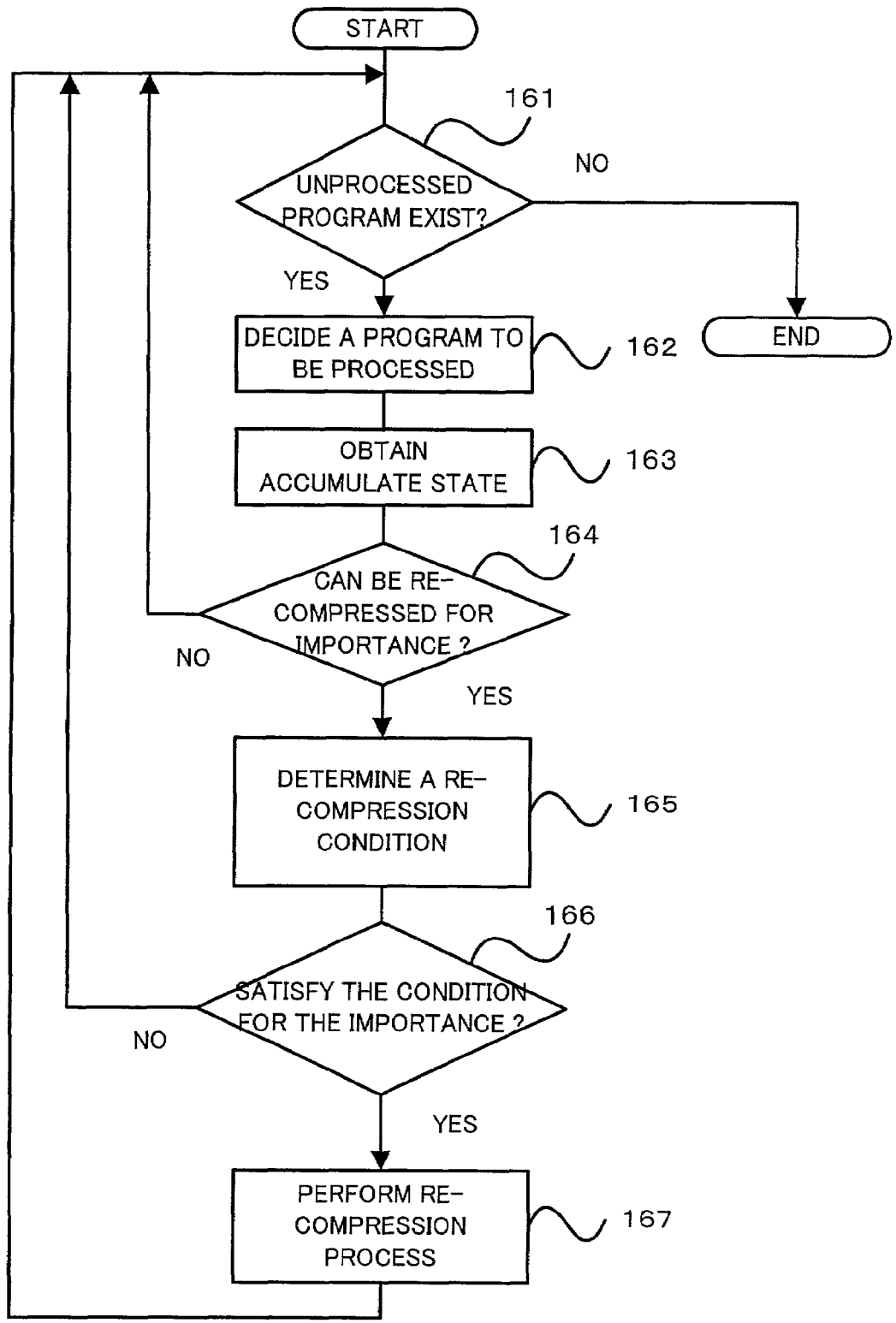
FIG. 16 shows a flowchart representing a process of a re-compression scheduler of the third embodiment of the invention.

Referring to FIG. 16, in re-compressing process, the re-compression scheduler 104 firstly determines whether there is an unprocessed program or not (step 161). If there is no unprocessed program, the re-compressing process is terminated. If there is at least one unprocessed program, the scheduler 104 determines a program to be processed (step 162).

Then, the scheduler 104 fetches accumulate state information of the program and an attribute of the program from the program management database (step 163). Next, the scheduler 104 determines whether a re-compressing process can be performed or not by comparing the number of compressing processes of the program with the upper limit value (step 164). If the scheduler 104 determines that the re-compressing process cannot be performed, the scheduler 104 registers the program as a processed program and returns to step 161.

If the re-compressing process can be performed, the scheduler 104 calculates an elapsed time from the date and time when the previous compressing process is performed to the present time (step 165). Then, the scheduler 104 refers to the compression setting table and determines whether or not the calculated elapsed time falls within the re-compression period corresponding to an importance of the program (step 166).

If the elapsed time is shorter than the re-compression period, the scheduler 104 registers the program as a processed program and returns to step 161.

If the elapsed time exceeds the re-compression period, the re-compression scheduler 104 designates a program to be processed and an encoding method used in a compressing process, and instructs the re-compressing unit 105 to compress data of the program (step 167). Then, the scheduler 104 registers the program as a processed program and returns to step 161.

The re-compressing unit 105 compresses the data of the program designated by the re-compression scheduler 104, and increments the number of compressing processes in the program management database 103 by one, and updates the date and time when the compressing process is performed.

The reproducing unit 106 fetches image data and sound data of the program recorded in the program accumulating unit 102 by a user's request, and reproduces the fetched data.

The program information database 107 stores the program information of an EPG.

The automatic recording unit 108 searches the data of the EPG for a program by using keywords or the like designated by a user to extract a user's favorite program and automatically records the extracted program. Also, the unit 108 records program information of the program which is recorded in the program management database 103. The program information includes an importance of the program.

According to this embodiment, the program recording device 100 changes a re-compression period or an encoding method based on an importance of a program, and the importance is decided from whether the program is recorded by automatic recording or designated recording, or from a degree of coincidence between data of an EPG about the program and keywords. Therefore, although the program accumulating unit 102 includes data of the program which are recorded by the automatic recording, the device 100 can compress the data of the program in the program accumulating unit 102 suitably.

According to the invention, it is possible to accumulate data of programs in a desirable condition for a user with keeping an area enough to accumulate additional data of programs, since the data of the programs can be recorded in a re-compression condition and an encoding method which are established considering user's using aspect of the data, that is, based on an importance of the data of the program or an attribute of the program.

Further, according to the invention, it is possible to accumulate data of programs in a desirable condition for a user with keeping a program recording area which tends to be short due to the automatic recording, since the data of the programs can be recorded in a re-compression condition and an encoding method which are established on the basis of a degree of coincidence between data of an EPG about the program and keywords or the like.

What is claimed is:

1. A program recording device which receives a broadcast program and accumulates data of the program, comprising:
    a recording unit which records the data of the program;
    a compression setting storing unit which stores, for each compressing timing, a re-compression condition which is a condition of starting a compression of a program and an encoding method used in the compression of the program;
    a re-compression scheduler which is repeatedly activated, selects programs satisfying the re-compression condition among the recorded data of programs in the recording unit, and designates the encoding method used in the compression of the selected programs by referring to the compression setting storing unit; and
    a re-compressing unit which compress data of the selected programs in the encoding method designated by the re-compression scheduler.

2. The program recording device of claim 1, wherein, in the compression setting storing unit, the re-compression condition and the encoding method are established for each importance of a program, and the re-compression scheduler selects programs which satisfy the re-compression condition which corresponds to an importance of each of the programs and the next compressing timing.

3. The program recording device of claim 2 further comprising:
an automatic recording unit which automatically records the data of the program according to a user's taste and registers an importance representing a degree of coincidence between the user's taste and a taste of the program, wherein the registered importance is related to the corresponding program.

4. The program recording device of claim 1, wherein, in the compression setting storing unit, the re-compression condition and the encoding method are established for each attribute of a program, and the re-compression scheduler selects programs which satisfy the re-compression condition which corresponds to an attribute of each of the program and the next compressing timing.

5. The program recording device of claim 4, wherein the attribute includes a type of a program.

6. The program recording device of claim 1, wherein the re-compression condition is a condition that a program to be processed is compressed when a predetermined period passes from when the previous compression of data of the program is performed.

7. The program recording device of claim 1, wherein an upper limit value is established about the compressing timing.

8. The program recording device of claim 1, wherein the encoding method includes a deletion of data of the program.

9. The program recording device of claim 1, wherein the compression of data of the program is made by reducing the number of frames of image data to be displayed per a second.

10. The program recording device of claim 1, wherein when image data which are included in the data of the program and are encoded by using a difference between frames are used, the data of the program is decoded and the decoded data is compressed.

11. The program recording device of claim 1, wherein when image data which are included in the data of the program and include a group consisting of first frames which are independently encoded and second frames which are next to the first frames and encoded by using the difference between the frames are used, the compression of data of the program is made by increasing the number of frames consisting of the group.

12. The program recording device of claim 1, wherein the compression of data of the program is made by encoding in an encoding method which produces a volume of data less than a volume of original data before the encoding method is executed.

13. A program recording method which receives a broadcast program and accumulates data of the program by using a computer, comprising the steps of:
recording the data of the program;
referring, at intervals of a predetermined period, to a re-compression condition which is a condition of starting a compression of a program and an encoding method used in the compression of the program, the re-compression condition and the encoding method being established for each compressing timing;
selecting programs satisfying the re-compression condition among the recorded data of programs;
designating the encoding method used in the compression of the selected programs; and
compressing data of the selected programs in the encoding method designated.

14. The method of claim 13, wherein the re-compression condition and the encoding method are established for each importance of a program, and the selecting step selects programs which satisfy the re-compression condition which corresponds to an importance of each of the programs and the next compressing timing.

15. The method of claim 14 further comprising the steps of:
automatic recording the data of the program according to a user's taste; and
registering an importance representing a degree of coincidence between the user's taste and a taste of the program, wherein the registered importance is related to the corresponding program.

16. The method of claim 13, wherein the re-compression condition and the encoding method are established for each attribute of a program, and the selecting step selects programs which satisfy the re-compression condition which corresponds to an attribute of each of the programs and the next compressing timing.

17. The method of claim 16, wherein the attribute includes a type of a program.

18. The method of claim 13, wherein the re-compression condition is a condition that a program to be processed is compressed when a predetermined period passes from when the previous compression of data of the program is performed.

19. The method of claim 13, wherein an upper limit value is established about the compressing timing.

20. The method of claim 13, wherein the encoding method includes a deletion of data of the program.

21. The method of claim 13, wherein the compression of data of the program is made by reducing the number of frames of image data to be displayed per a second.

22. The method of claim 13, wherein when image data which are included in the data of the program and are encoded by using a difference between frames are used, the data of the program is decoded and the decoded data is compressed.

23. The method of claim 13, wherein when image data which are included in the data of the program and include a group consisting of first frames which are independently encoded and second frames which are next to the first frames and encoded by using the difference between the frames are used, the compression of data of the program is made by increasing the number of frames consisting of the group.

24. The method of claim 13, wherein the compression of data of the program is made by encoding in an encoding method which produces a volume of data less than a volume of original data before the encoding method is executed.

25. A computer readable medium embodying a program of instructions executable by the computer to perform a program recording method which receives a broadcast program and accumulates data of the program, the method comprising the steps of:
recording the data of the program;
referring, at intervals of a predetermined period, to a re-compression condition which is a condition of starting a compression of a program and an encoding method used in the compression of the program, the re-compression condition and the encoding method being established for each compressing timing;

selecting programs satisfying the re-compression condition among the recorded data of programs;

designating the encoding method used in the compression of the selected programs; and compressing data of the selected programs in the encoding method designated.

26. A program product comprising, computer readable instructions and a computer readable medium bearing the computer readable instructions, the instructions being adaptable to enable a computer to perform a program recording method which receives a broadcast program and accumulates data of the program, the method comprising the steps of:

recording the data of the program;

referring, at intervals of a predetermined period, to a re-compression condition which is a condition of starting a compression of a program and an encoding method used in the compression of the program, the re-compression condition and the encoding method being established for each compressing timing;

selecting programs satisfying the re-compression condition among the recorded data of programs;

designating the encoding method used in the compression of the selected programs; and compressing data of the selected programs in the encoding method designated.

* * * * *